United States Patent [19]

Koizumi et al.

[11] 4,180,852

[45] Dec. 25, 1979

[54] CONTROL CIRCUIT FOR USE IN A SWITCHING-TYPE REGULATOR

[75] Inventors: Akio Koizumi, Tokyo; Hiroshi Nakazawa, Kawagoe; Mitsuo Ohsawa, Chigasaki, all of Japan

[73] Assignee: Sony Corporation, Tokyo, Japan

[21] Appl. No.: 927,549

[22] Filed: Jul. 24, 1978

[30] Foreign Application Priority Data

Jul. 25, 1977 [JP] Japan ............... 52-88933

[51] Int. Cl.² ........................... H02P 13/22
[52] U.S. Cl. .......................... 363/49; 323/1; 323/DIG. 1; 363/21
[58] Field of Search ............. 323/1, 17, DIG. 1; 363/21, 49, 124

[56] References Cited

U.S. PATENT DOCUMENTS

| | | | |
|---|---|---|---|
| 3,458,796 | 7/1969 | Cassady | 363/49 |
| 3,562,621 | 2/1971 | Schaefer | 363/49 X |
| 4,063,307 | 12/1977 | Stephens | 363/49 X |
| 4,130,862 | 12/1978 | Holt | 363/49 |

*Primary Examiner*—A. D. Pellinen
*Attorney, Agent, or Firm*—Lewis H. Eslinger; Alvin Sinderbrand

[57] ABSTRACT

A control circuit is disclosed for use in a switching-type regulator which includes a source of unregulated DC voltage, a switching circuit for interrupting the unregulated DC voltage to produce an AC voltage having a duty cycle which is a function of the operation of the switching circuit, a converter for converting the AC voltage to a regulated DC voltage, a controllable pulse generator for supplying pulses of controllable duration to the switching circuit so as to determine the duty cycle of the AC voltage, a feedback circuit responsive to variations in the regulated DC voltage for controlling the duration of the generated pulses to maintain the regulated DC voltage at a desired level, and disabling circuit for selectively limiting the operation of the pulse generator. The control circuit is used to reset the disabling circuit to an initial state and to change gradually the duration of the pulses which are generated by the pulse generator when the regulator first is turned ON. By resetting the disabling circuit, there is no limitation on the operation of the pulse generator at the outset. By gradually increasing the duration of the pulses generated by the pulse generator, the so-called "soft start" operation is performed, whereby the regulated DC voltage gradually is increased from a zero level to its desired level. The control circuit includes a voltage generator for generating a control voltage which increases rapidly during an initial interval and then increases at a significantly slower rate after it attains a first level. The disabling circuit is reset when the control voltage reaches its first level; and when the control voltage thereafter increases at a much slower rate, the slowly-increasing control voltage is used to correspondingly increase the duration of the generated pulses, whereby the level of the regulated DC voltage likewise increases.

10 Claims, 3 Drawing Figures

CONTROL CIRCUIT FOR USE IN A SWITCHING-TYPE REGULATOR

BACKGROUND OF THE INVENTION

This invention relates to a control circuit for use in a switching-type regulator and, more particularly, to an improved control circuit which is used when the regulator first is turned ON so as to reset the regulating circuitry to an initial operating state and to achieve a gradual increase toward the operating voltage level in the output of the regulator.

One type of a switching regulator includes a source of unregulated DC voltage, such as may be derived by a full wave rectifier from AC supply mains, a switching circuit to periodically interrupt the unregulated DC voltage so as to derive an AC voltage therefrom, and an output rectifier which rectifies the AC voltage to produce a regulated DC voltage. The level of this regulated DC voltage is determined by the duty cycle of the switching circuit. That is, if the switching circuit is turned ON for only a small portion of each AC period, the integrating capacitor included in the output rectifier is charged to a corresponding small DC voltage level. As the duty cycle of the switching circuit increases, the DC voltage to which the integrating capacitor is charged correspondingly increases. Accordingly, in order to regulate this DC voltage to maintain a constant, desired level, the output voltage from the regulator is compared to a predetermined reference voltage, and any difference therebetween is used to control the duty cycle of the switching circuit in a manner which corrects, or compensates, for errors or changes in the regulator output voltage. As one example, the switching circuit is driven by a pulse width modulating generator which generates drive pulses whose durations are controlled as a function of the detected changes or variations in the regulator output voltage.

During an initial start-up operation, that is, when the regulator first is turned ON, such as by first connecting the regulator to AC supply mains or by first closing a power supply switch, the initial AC output voltage produced by the regulator is equal to zero. Consequently, a maximum error voltage may be supplied to the pulse width modulating pulse generator, thus resulting in drive pulses of maximum duration. Such drive pulses produce an abrupt, large increase in the DC output voltage produced by the regulator. Such an abrupt, large increase in the output voltage is not desirable. Furthermore, in those regulators which use a transformer to couple the AC voltage produced by the switching circuit to the ouput rectifier, such an abrupt, large increase in the output voltage, which is due to an abrupt increase in the duty cycle of the switching circuit, may cause a ringing in the core of the transformer.

In order to avoid this sudden start-up operation, a so-called "soft start" function is performed. This may be achieved by charging the capacitor with the aforementioned error voltage, that is, the voltage difference between the DC output voltage of the regulator and the desired reference level thereof. As this capacitor charges, its output voltage correspondingly increases, and this increasing voltage is used to effect an increase in the pulse duration of the drive pulses which are supplied to the switching circuit by the pulse width modulating pulse generator. Thus, rather than providing a sudden increase in the duty cycle of the switching circuit, the duty cycle thereof increases in a relatively gradual manner. Consequently, the DC output voltage of the regulator increases gradually. The time constant of this "soft start" operation may be on the order of 1 to 3 seconds.

The switching circuit of the aforedescribed type also may be provided with a protection circuit which prevents the regulator from producing a dangerously high over-current. Such a protection circuit may include a current detecting device which, when an over-current condition is detected, triggers a flip-flop circuit which, in turn, limits or disables the operation of the pulse width modulating pulse generator. If the pulse generator is disabled thereby, the DC output voltage of the regulator may be reduced to zero. On the other hand, if the triggered flip-flop circuit functions merely to limit the operation of the pulse generator, the duration of the pulses generated thereby may be limited to a relatively short portion of the AC period so as to reduce th AC output voltage of the regulator to a relatively low, safe level. In any event, in order to ensure proper initial operation of the regulator, it is necessary that this flip-flop circuit be reset when the regulator first is turned ON.

In order to rest the aforementioned flip-flop circuit for the purpose described above, when the regulator first is turned ON, a capacitor may be charged rapidly to a voltage level which is sufficient to carry out this reset operation. The time constant for charging such a capacitor may be on the order of 1 to 10 msec.

In order to carry out the soft start and reset operations discussed above, it has been thought heretofore that two separate timing circuits, including two separate capacitors, must be provided. In view of the marked difference between the soft start time constant and the reset time constant, it had been thought that successful operation with a single timing capacitor is not feasible.

Furthermore, and as may be appreciated, after the flip-flop circuit is reset and after the soft start operation is carried out, the timing circuits, and particularly the capacitors therein, which are used for these operations are no longer needed. That is, during normal operation of the regulator, these timing circuits and capacitors perform no useful purpose. Therefore, if the regulator is formed as an integrated circuit, it is preferred that these capacitors not be included therein. This means that two pairs of external terminals, one pair for each capacitor, must be provided in order to connect such capacitors to the regulator. The cost of fabricating an integrated circuit is influenced substantially by the number of external terminals which must be provided therewith. Hence, by requiring two pairs of external terminals, a regulator of integrated circuit construction is subject to relatively high manufacturing costs.

While the use of a single capacitor would contribute favorably to lower manufacturing costs of such an integrated circuit regulator, as mentioned above, it had not been thought feasible to eliminate the reset or soft start capacitor because of the substantial difference in the time constants attending the reset and soft start circuits. Furthermore, it is not advisable to seek a compromise in the reset and soft start time constants. If the time constant of the reset circuit is increased, it is possible that a proper reset pulse might not be produced. Hence, the flip-flop circuit might not be reset, and proper operation of the regulator is inhibited. Conversely, if the time constant of the soft start circuit is reduced, the initial DC output voltage of the regulator may rise too rapidly, thus defeating the purpose of the soft start operation. Thus, a compromise time constant for use in both the reset and soft start circuits is not practical.

OBJECTS OF THE INVENTION

Therefore, it is an object of the present invention to provide an improved control circuit for use in a switching-type regulator which avoids the aforenoted problems.

Another object of this invention is to provide a control circuit for use in a switching-type regulator, the control circuit functioning to carry out a reset operation and a soft start operation while using a single timing circuit, such as a single timing capacitor.

A further object of this invention is to provide an improved control circuit for use in a switching-type regulator which can be economically fabricated as an integrated circuit.

An additional object of this invention is to provide a control circuit for use in a switching-type regulator, the latter including a controllable pulse generator, such as a pulse width modulating pulse generator, for generating pulses whose duty cycles determine the DC output voltage of the regulator, and also including a disabling circuit for disabling or limiting the operation of the pulse generator in the event of, for example, an over-current condition, the control circuit including a single timing circuit which operates when the regulator first is turned ON for generating a control voltage which increases rapidly to reset the disabling circuit, and thereafter increases slowly to gradually increase the duty cycle of the generated pulses.

Various other objects, advantages and features of the present invention will become readily apparent from the ensuing detailed description, and the novel features will be particularly pointed out in the appended claims.

SUMMARY OF THE INVENTION

In accordance with this invention, a control circuit is provided for use in a switching-type regulator, the latter including a source of unregulated DC voltage, a switching circuit for interrupting the unregulated DC voltage to produce an AC voltage having a duty cycle which is a function of the operation of the switching circuit, a converter for converting the AC voltage to a regulated DC voltage, a controllable pulse generator for supplying pulses of controllable duration to the switching circuit thereby determining the duty cycle of the AC voltage, a feedback circuit responsive to variations in the regulated DC voltage for controlling the duration of the generated pulses so as to maintain the regulated DC voltage at a desired level, and a disabling circuit for selectively disabling or limiting the operation of the pulse generator. The control circuit is responsive to a predetermined condition, such as the turning ON of the regulator, to reset the disabling circuit to an initial state and to gradually change the duration of the pulses which are generated by the pulse generator. The control circuit comprises a voltage generator for generating a control voltage which changes rapidly until a predetermined level thereof is reached, whereupon this control voltage then changes relatively slowly. The disabling circuit is reset when the control voltage reaches its determined level, and the slowly changing control voltage is used to correspondingly change the duration of the pulses which are generated by the pulse generator, whereby the level of the regulated DC voltage likewise changes gradually.

BRIEF DESCRIPTION OF THE DRAWINGS

The following detailed description, given by way of example, will best be understood in conjunction with the accompanying drawings in which.

DETAILED DESCRIPTION OF SOME OF THE PREFERRED EMBODIMENTS

Figure 1:
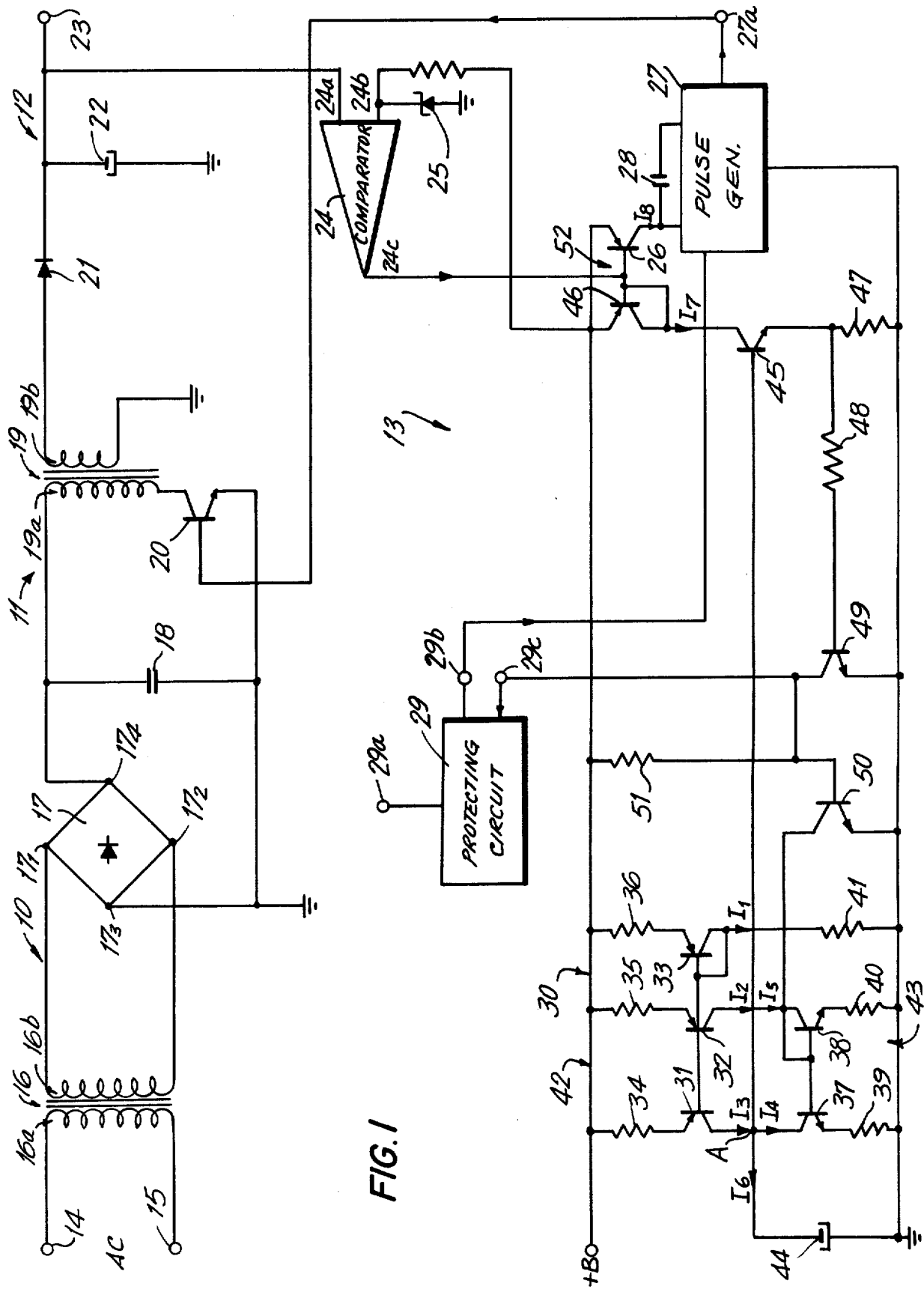
FIG. 1 is a schematic diagram of one embodiment of a control circuit in accordance with the present invention.

Referring now to the drawings, and in particular to FIG. 1, there is illustrated a schematic representation of one embodiment of a control circuit 13 in conjunction with a switching-type voltage regulator. This regulator is comprised of an AC/DC converter 10 for converting an AC supply, such as may be supplied by AC mains, to an unregulated DC voltage, a switching circuit 11 which is adapted to convert the unregulated DC voltage to an AC voltage having a duty ratio determined by control pulses which are supplied to the switching circuit, an AC/DC converter which converts the latter AC voltage to a regulated DC voltage, and a feedback circuit which is adapted to detect variations or changes in the regulated DC voltage relative to a predetermined reference level and to control the switching circuit as a function of such detected variations. More particularly, the switching-type regulator includes a transformer 16 whose primary winding 16a is coupled to the AC mains by inputs 14 and 15. Transformer 16 includes a secondary winding 16b which is connected into a full-wave rectifier 17, shown herein as a bridge rectifier. The AC inputs $17_1$ and $17_2$ of full-wave rectifier 17 are coupled to secondary winding 16b and the DC outputs $17_3$ and $17_4$ of the full-wave rectifier are connected to switching circuit 11. A filtering capacitor 18 is provided across DC outputs $17_3$ and $17_4$, and DC output $17_3$ is connected to a reference potential, such as ground.

Switching circuit 11 is comprised of a transformer 19 having its primary winding 19a coupled via a switching transistor 20 to DC outputs $17_3$ and $17_4$ of full-wave rectifier 17. Transformer 19 includes a secondary winding 19b having one terminal coupled to ground and its other terminal coupled to rectifier 12 which is formed of a diode 21 and an integrating capacitor 22 connected to the output of diode 21. The output voltage across capacitor 22 is supplied to a regulator output terminal 23, and this output voltage is determined by the amplitude of the unregulated DC voltage produced at the DC outputs of full-wave rectifier 17 and the duty ratio of switching transistor 20. That is, if switching transistor 20 is periodically rendered conductive and non-conductive, that is, if the switching transistor is periodically turned ON and OFF, then, assuming a constant unregulated DC voltage, the voltage across capacitor 22 is a function of the ON duration of the transistor 20. As this duration increases, as the duty cycle increases, the DC output voltage at regulator output terminal 23 increases. Conversely, as the duty cycle of transistor 20 is reduced, the regulator output voltage likewise is reduced.

The regulating function is performed by controlling the duty cycle of switching transistor 20 as a function of variations or changes in the DC output voltage of the regulator. This is achieved by the comparator 24, which may comprise a differential amplifier, having one input 24a connected to regulator output terminal 23 for receiving the regulator DC output voltage, and another input 24b coupled to Zener diode 25 which is supplied with an operating voltage +B (which may be an unregulated DC voltage) for supplying a reference voltage. The output 24c of comparator 24 produces an error signal, such as an error voltage, which is a function of the difference between the DC output voltage of the regulator and the reference voltage furnished by Zener diode 25. Thus, this error voltage changes as the regulator output voltage changes.

The error voltage produced by comparator 24 is supplied to a transistor 26 for controlling the conductivity, and thus the current flow, thereof. This transistor, shown herein as a PNP transistor, has its emitter electrode coupled to power supply +B and its collector electrode coupled to a pulse generator 27 shown herein as a multivibrator having a time constant capacitor 28 connected thereto. This multivibrator, which may be an astable multivibrator or other pulse generator, is adapted to generate periodic pulses, the duration, or width of each pulse being controlled as a function of the current which is supplied thereto by transistor 26. As this current increases, the duration of the generated pulses increase. Conversely, as this current decreases, the duration of the generated pulses likewise decreases. The output of pulse generator 27 is coupled to an output terminal 27a which, in turn, is connected to the base electrode of switching transistor 20.

Before describing control circuit 13, the manner in which the illustrated switching-type regulator operates will be briefly discussed. An unregulated DC voltage is supplied to transformer 19 from the AC mains by transformer 16, full-wave rectifier 17 and filtering capacitor 18. When pulse generator 27 supplies a pulse to the base electrode of transistor 20, this transistor is turned ON and DC current flows through primary winding 19a and the collector-emitter circuit of transistor 20. When this pulse terminates, transistor 20 is turned OFF so as to interrupt the current flow through primary winding 19a. The ON-OFF operation of this transistor converts the unregulated DC voltage supplied to transformer 19 into an AC voltage which appears across secondary winding 19b. The duty cycle of this secondary voltage is, of course, determined by the duty cycle of transistor 20 which, in turn, is determined by the duty cycle of the pulses generated by pulse generator 27.

The AC voltage provided across the secondary winding of transformer 19 is rectified by diode 21 to charge capacitor 22 to a DC voltage level. This DC voltage level is compared in comparator 24 to the predetermined reference level established by Zener diode 25. As may be appreciated, other well-known reference circuits may be used to supply a desired reference level to the comparator. Depending upon the difference between the DC voltage across capacitor 22 and appearing at regulator output terminal 23, and the reference voltage supplied to input 24b of comparator 24, an error voltage is applied to transistor 26 by the comparator. This error voltage determines the conductivity, and thus the current flow of transistor 26. Let it be assumed that the regulator output voltage is less than the reference voltage. As a consequence thereof, the error voltage supplied to transistor 26 results in an increase in the current supplied to pulse generator 27. This, in turn, increases the duty cycle, or duration, of the drive pulses which are supplied to transistor 20. Accordingly, as the duty cycle of the AC voltage provided across secondary winding 19b increases, the voltage to which capacitor 22 is charged also increases.

Alternatively, let it be assumed that the regulator output voltage exceeds the references voltage supplied to comparator 24. As a consequence thereof, the error voltage which is applied to transistor 26 results in a decrease in the current supplied to pulse generator 27. Accordingly, the duty cycle, or duration, of the drive pulses supplied to transistor 20 likewise are reduced. Therefore, the duty cycle of the AC voltage provided across secondary winding 19b is reduced so as to correspondingly decrease the voltage to which capacitor 22 is charged.

In view of the foregoing discussion, it is appreciated that comparator 24 detects the regulator output voltage and controls pulse generator 27 in a manner to compensate, or correct, for undesired changes or variations in this regulator output voltage.

The illustrated switching-type regulator also may include a protection circuit 29. This protection circuit includes an input terminal 29a which is adapted to be supplied with a signal, such as a voltage, which represents the magnitude of the current in or produced by the regulator. For example, a resistor of relatively low resistance may be connected to the primary winding of transformer 19 so as to produce a voltage thereacross, and this voltage may be supplied to input terminal 29a of protection circuit 29. In the event that this applied voltage exceeds a predetermined level, thus representing an over-current condition, a disabling or limiting signal may be produced by the protection circuit at an output terminal 29b thereof. Alternatively, transformer 19 may be provided with an auxiliary winding to produce the voltage representing an over-current condition. In either embodiment output terminal 29b is coupled to a control input of pulse generator 27 and is adapted either to disable further operation of the pulse generator or, as an alternative, may be adapted to limit the duration of the pulses produced thereby to some predetermined width. Therefore, if an over-current condition is detected, pulse generator 27 may be disabled so as to terminate the pulses which are supplied to switching transistor 20. As a result thereof, the DC output voltage produced at regulator output terminal 23 is reduced to zero. Alternatively, if an over-current condition is detected, protection circuit 29 may supply a limiting control signal to pulse generator 27 which limits the duration of the pulses generated thereby to a predetermined duration. This duration preferably is selected to be sufficiently narrow so as to reduce the duty cycle of the AC voltage provided across secondary winding 19b, and thus significantly reduce the DC output voltage produced at regulator output terminal 23. Thus, by reason of protection circuit 29, a hazardous voltage current condition, as may be due to an unexpected reduction in the load coupled to the regulator, is avoided. Also, protection circuit 29 functions to detect when the ripple component included in the unregulated DC voltage which is supplied to primary winding 19a by full-wave rectifier 17 is too large. In that event, the protection circuit functions to disable or limit the operation of pulse generator 27.

Protection circuit 29 may include a flip-flop circuit, or other bi-state device which normally exhibits a first state, such as a reset state, and is triggered to a second state, such as a set state, in response to a detected over-current or excessive ripple voltage condition. Pulse generator 27 is disabled or limited in its operation when the flip-flop circuit included in protection circuit 29 is triggered to its set state.

Preferably, transformer 19 is a high frequency transformer or may otherwise be capable of receiving and coupling AC signals of a relatively high frequency. For example, the drive pulses which are supplied to transistor 20 by pulse generator 27 may have a frequency on the order of 20–30 kHz.

Control circuit 30, now to be described in greater detail, is responsive to a predetermined condition, for example, the initializing or turning ON of the regulator, to reset protection circuit 29 and to gradually increase the duration of the pulses generated by pulse generator 27. It is recalled that if the flip-flop circuit included in protection circuit 29 assumes its set state, pulse generator 27 is disabled or, alternatively, is limited in its operation. Since it is possible that, when the illustrated circuitry first is turn ON this flip-flop circuit may assume its set state, it is desirable to supply a reset signal thereto so as to assure that this flip-flop circuit initially will be reset, thereby enabling the pulse generator to perform properly. Also, when the illustrated regulator first is turned ON, the error signal produced by comparator 24 is quite large. This large error signal, if supplied directly to pulse generator 27, would result in drive pulses of maximum duration generated thereby. As a consequence thereof, the DC voltage produced at regulator output terminal 23 would increase abruptly to a relatively high level. Control circuit 30 is adapted to avoid this undesirable occurrence and to effect a "soft-start" of the regulator output by gradually increasing the current supplied to pulse generator 27 so as to correspondingly increase gradually the duration of the drive pulses generated thereby, and thus increase gradually the DC voltage produced at the regulator output terminal.

The foregoing functions of control circuit 30 are achieved by a current mirror circuit 42 comprised of transistors 31, 32 and 33, a current mirror circuit 43 comprised of transistors 37 and 38, a condenser 44, a switching transistor 50, a control transistor 45 and another current mirror circuit 52 comprised of transistor 46 and aforementioned transistor 26. Transistors 31, 32 and 33 included in current mirror circuit 42 are PNP transistors having their respective base electrodes connected in common. A source of unregulated DC voltage +B is supplied to the emitter electrodes of transistors 31, 32 and 33 via emitter resistors 34, 35 and 36, respectively. The base electrode of transistor 33 is connected to the collector electrode thereof, and this collector electrode is further connected to ground by a collector resistor 41. The collector electrodes of transistors 31 and 32 are connected to the collector electrodes of transistors 37 and 38, respectively, the latter transistors being included in current mirror circuit 43. In addition, the collector electrode of transistor 31 is further connected to condenser 44 so as to supply a charge current therefor. The junction defined by the collector electrode of transistor 31 and capacitor 44 is identified by reference A.

In current mirror circuit 43, the collection electrode of transistor 38 is connected to the base electrode thereof, and this base electrode is further connected to the base electrode of transistor 37. The emitter electrodes of transistors 37 and 38 are coupled to ground by emitter resistors 39 and 40, respectively. Preferably, the resistance values of resistors 39 and 40 differ from each other, with resistor 39 being of a higher resistance than resistor 40.

Switching transistor 50 has its collector-emitter circuit connected in shunt relation with the collector-emitter circuit of transistor 38 and, therefore, is connected in series between the collector electrode of transistor 32 and ground. The base electrode of transistor 50 is coupled to DC source +B via a resistor 51.

Junction A, also referred to herein as the output of condenser 44, is connected to the base electrode of control transistor 45. The emitter electrode of this control transistor is coupled to ground by the resistor 47. This emitter electrode additionally is coupled through a resistor 48 to the base electrode of a transistor 49, the collector electrode of this latter transistor being connected to the base electrode of switching transistor 50. The collector electrode of transistor 49 also is coupled to the reset input 29c of the flip-flop circuit included in protection circuit 29. As will be explained below, this flip-flop circuit is reset in response to a voltage of relatively low level supplied to reset input 29c.

The collector-emitter circuit of transistor 45 is connected in series with the collector-emitter circuit of transistor 46 included in current mirror circuit 52. The base electrode of transistor 46 is connected to the collector electrode thereof and this base electrode also is connected to the base electrode of transistor 26. The emitter electrodes of transistors 26 and 46 are connected in common to DC source +B.

As is known, in a current mirror circuit, if the impedance connected in each of the collector-emitter circuits is equal, then the collector-emitter currents are equal. For the purpose of the present discussion, the circuit formed of, for example, an emitter resistor in series with the collector-emitter circuit of a current mirror transistor is designated as a current conducting channel. Thus, if resistors 34, 35 and 36 all exhibit equal resistance values, then the currents flowing through the respective current conducting channels (i.e., transistor 31 and resistor 34, transistor 32 and resistor 35, and transistor 33 and resistor 36) all are equal. If these currents through the respective current conducting channels are designated $I_1$, $I_2$ and $I_3$, as shown in FIG. 1, then $I_1 = I_2 = I_3$. With respect to current mirror circuit 43, it is assumed that the resistance of resistor 39 is greater than the resistance of resistor 40. Consequently, the current flowing through the current conducting channel formed of transistor 37 and resistor 39, designated $I_4$, is less than the current flowing the current conducting channel formed of transistor 38 and resistor 40, designated $I_5$. Accordingly, current $I_4$ is less than current $I_5$ ($I_4 < I_5$).

With reference to current mirror circuit 52, the current flowing through the current conducting channel formed of transistor 46 is designated $I_7$, and this current is equal to the current flowing through the current conducting channel formed of transistor 26, designated $I_8$ ($I_7 = I_8$).

In operation, let it be assumed that the regulator first is turned ON, such as by being connected to the AC mains or by closing a suitable switch. Let it be further assumed that when the regulator first is turned ON, a suitable, unregulated DC voltage +B is provided at the illustrated DC source. This voltage is supplied through resistor 51 to the base electrode of transistor 50 and, additionally, to the collector electrode of transistor 49. Consequently, transistor 50 is turned ON to provide a low impedance conducting path for the current flowing through the current conducting channel including transistor 32 in current mirror circuit 42. Furthermore, since the voltage at the collector electrode of transistor 50 is relatively low, almost equal to ground potential, the voltage supplied therefrom to the base electrode of transistor 38 likewise is relatively low. Hence, transistor 38 is maintained non-conductive. Accordingly, current $I_2$ flows from the collector electrode of transistor 32 through the collector-emitter circuit of transistor 50. This current is equal to the current flowing through transistors 31 and 33, whereby $I_1$ equal $I_2$ equals $I_3$. However, since transistor 38 is non-conductive, it is appreciated that transistor 37, connected in current mirror configuration to transistor 38, likewise is non-conductive. Therefore, current $I_3$ which flows through transistor 31 cannot flow through transistor 37 but, rather, flows as a charging current $I_6$ to condenser 44. It is assumed that resistors 34, 35 and 36 are suitably selected such that charging current $I_6$ is of a relatively high magnitude. Hence, condenser 44 charges at a relatively rapid rate to produce a control voltage which increases rapidly with respect to time.

This increasing voltage across the condenser is applied to the base electrode of transistor 45. Until the time that the base voltage of this transistor attains a threshold turn-ON level, transistor 45 is non-conductive. Thus, initially, current $I_7$ does not flow from transistor 46 through transistor 45. This means that current $I_8$ does not flow to pulse generator 27 from transistor 26. Consequently, pulse generator 27 does not operate or, alternatively, the duration of the pulses generated thereby is maintained at a minimum.

When the voltage across condenser 44 reaches the threshold level sufficient to turn ON transistor 45, the conductivity of this transistor is determined by the base voltage applied thereto. As current now flows through transistor 45, a voltage is produced across resistor 47, this voltage being applied to transistor 49 to render this transistor conductive. Hence, the voltage at the collector electrode of transistor 49 now drops from a relatively high level (approximately +B) to approximately ground potential thereby supplying the reset signal to reset input 29c of protection circuit 29. Thus, condenser 44 rapidly charges from an initial zero level such that the protection circuit is reset shortly after the regulator is turned ON.

When transistor 49 is turned ON, the low potential supplied thereby to the base electrode of switching transistor 50 turns this latter transistor OFF. This removes the low impedance path which had been connected to the collector electrode of transistor 32 included in current mirror circuit 42. Furthermore, when transistor 50 is turned OFF, the low voltage which had been applied to the base electrode of transistor 38 now is removed. Accordingly, both conducting channels included in current mirror circuit 43 are enabled to conduct. Current $I_2$ from transistor 32 flows through transistor 38 as current $I_5$. Because of current mirror action, and in view of the different resistance values of resistors 39 and 40, when current $I_5$ flows through transistor 38, a smaller current $I_4$ flows through transistor 37. Since $I_5 = I_2 = I_3$, and since $I_4$ is less than $I_5$, it follows that $I_3 = I_4 + I_6$. Stated otherwise, $I_6 = I_3 - I_4$. It is recalled that when the regulator first had been turned ON, charging current $I_6 = I_3$. Now, however, this charging current is substantially reduced because $I_6 = I_3 - I_4$. Therefore, once the voltage across condenser 44 attains the threshold level sufficient to render transistor 45 conductive and thus reset protection circuit 29, a reduced charging current flows thereto so as to correspondingly reduce the rate at which the voltage thereacross increases. Thus, the condenser voltage which is applied to the base electrode of transistor 45, now increases at a relatively slow rate. This means that the conductivity of transistor 45 likewise increases at a slow rate. Hence, current $I_7$, and thus $I_8$, increase relatively slowly. As current $I_8$ increases gradually, the duration of the pulses generated by pulse generator 27 increases gradually. Hence, the duty cycle of the AC voltage produced across secondary winding 19b by reason of the operation of switching transistor 20 increases gradually so as to increase the DC voltage produced at regulator output terminal 23. This gradual increase in the regulator output voltage is the so-called soft start operation. Of course, once condenser 44 is sufficiently charged, the soft start operation is completed and the control of the pulse generator 27 is effected by comparator 24 and protection circuit 29, as discussed above.

Figure 2:
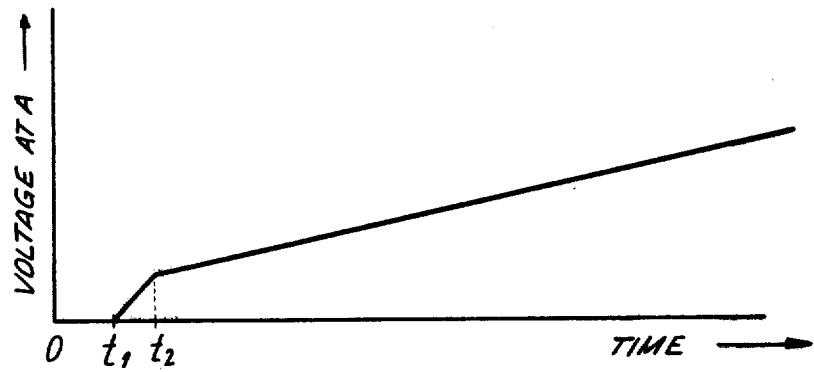
FIG. 2 is a graphical representation of the control voltage which is produced by the control circuit shown in FIG. 1.

A graphical representation of the manner in which the voltage across condenser 44 changes is illustrated in FIG. 2. Assuming that the regulator is turned ON at time $t_1$, the relatively high charging current $I_6$ ($I_6 = I_3 = I_2 = I_5$) results in a rapid increase in the condenser voltage. This increase in voltage attains the threshold level sufficient to render transistor 45 conductive at time $t_2$. At this time, protection circuit 29 is reset. Also, transistor 50 is turned OFF and current mirror circuit 43 is turned ON. Thus, from time $t_2$, the charging current $I_6$ is substantially reduced ($I_6 = I_5 - I_4$). Hence, from time $t_2$, the duty cycle of the pulses generated by pulse generator 27, and thus the DC voltage produced at regulator output terminal 23, gradually increases. This gradual increase is achieved relatively slowly so that the soft start operation is performed. It is recognized that, although the voltage across condenser 44 increases rapidly from time $t_1$ to time $t_2$, transistor 45 is non-conductive during this interval and, therefore, no current flows therethrough. Hence, $I_7 = I_8 = 0$ during the interval $t_1 - t_2$. As an example, the reset interval ($t_1 - t_2$) is on the order of 1 to 10 msec.; while the soft start duration is on the order of 1 to 3 sec.

While the foregoing description has assumed that the timing circuit which is used to control the reset and soft start operations is formed of a condenser 44, it is appreciated that other equivalent timing devices can be used. For example, a clock generator and a counter may be provided. The clock pulses produced by the clock generator may be supplied directly to the counter when transistor 50 is turned ON. When this counter reaches a predetermined count, this count is decoded and transistor 45 is turned ON. Thus, at this predetermined count, protection circuit 29 is reset and transistor 50 is turned OFF. Also, a frequency-divider may be provided between the clock generator and the counter. When transistor 50 is turned OFF, the clock pulses may be gated to the counter through the frequency divider. Thus, following the reset of protection circuit 29, the count of the counter will change at a much slower rate. The output of this counter then may be used to control the current flowing through current mirror 52 and, thus, the duty cycle of the pulses generated by pulse generator 27.

Figure 3:
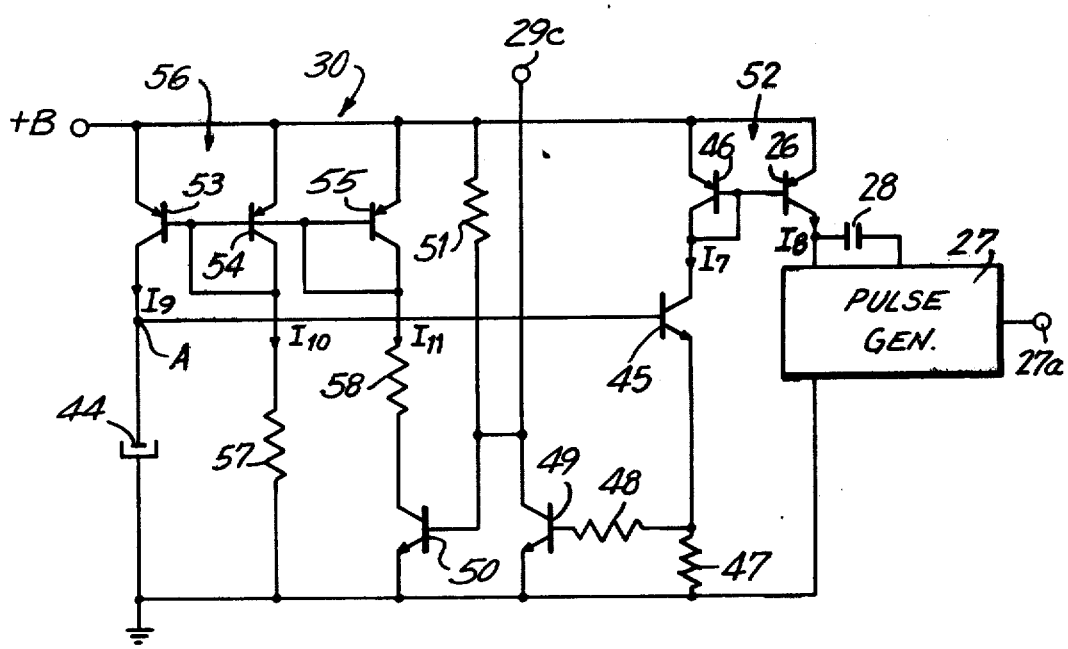
FIG. 3 is a schematic diagram of another embodiment of the control circuit in accordance with this invention.

An alternative embodiment of control circuit 30 is schematically illustrated in FIG. 3. In this alternative embodiment, transistors 45, 49 and 50 are the same as aforedescribed transistors 45, 49 and 50, shown in FIG. 1. Also, current mirror circuit 52 in FIG. 3 is similar to current mirror circuit 52 described in FIG. 1. Thus, reset input 29c is shown as being connected to the collector electrode of transistor 49; and current $I_8$ is supplied to pulse generator 27 by current mirror circuit 52.

FIG. 3 differs from FIG. 1 in that previously described current mirror circuit 42 is replaced by current mirror circuit 56, and previously current mirror circuit 43 is omitted. Current mirror circuit 56 is comprised of PNP transistors 53, 54 and 55 whose emitter electrodes are connected in common to DC source +B. The collector electrode of transistor 53 is connected to condenser 44 at junction A, and current $I_9$ flows through this transistor. Transistor 54 has its base and collector electrodes connected in common, and its collector electrode is further coupled to ground through a resistor 57. A current $I_{10}$ flows through this transistor. Transistor 55 also has its base and collector electrodes connected in common, and its collector electrode is further coupled to the collector of transistor 50 by a resistor 58.

The base electrodes of transistors 53, 54 and 55 all are connected in common. Furthermore, the resistance values of resistors 57 and 58 are selected such that the current flowing through transistor 53 is equal to the sum of the currents flowing through transistors 54 and 55 ($I_9 = I_{10} + I_{11}$).

In operation, it is assumed that condenser 44 initially is discharged. Hence, when the regulator (not shown) first is turned ON, DC source +B turns transistor 50 ON so that current $I_{11}$ flows from transistor 55 through transistor 50. The charging current $I_9$ ($I_9 = I_{10} + I_{11}$) is relatively high so as to rapidly charge capacitor 44. When this condenser voltage reaches the threshold level sufficient to render transistor 45 conductive, current flows through this latter transistor so as to render transistor 49 conductive. As a consequence thereof, switching transistor 50 is turned OFF, and current $I_{11}$ no longer flows therethrough. This means that the current through transistor 55 is equal to zero. Therefore, charging current $I_9$ now is substantially reduced ($I_9 = I_{10} + 0$), whereby the voltage across condenser 44 now continues to increase, but at a substantially slower rate. Accordingly, the volage across condenser 44 increases in accordance with the graphical representation shown in FIG. 2.

If desired, the resistance of resistor 57 may be selected to be much greater than the resistance of resistor 58. This means that current $I_{10}$ is much less than current $I_{11}$. Accordingly, when transistor 45 is rendered conductive, charging current $I_9$ is markedly reduced ($I_9 = I_{10}$).

Therefore, it is appreciated that, in the embodiment shown in FIG. 3, when the regulator (not shown) first is turned ON, protection circuit 29 is reset shortly thereafter. Then, following the resetting of this protection circuit, the duty cycle of the pulses generated by pulse generator 27 increases gradually so as to correspondingly increase the DC voltage provided at the regulator output terminal in a gradual manner.

While the present invention has been particularly shown and described with reference to certain preferred embodiments thereof, it should be readily apparent to those of ordinary skill in the art that various changes and modifications in form and details can be made without departing from the spirit and scope of the invention. Although a single condenser 44 has been shown, the timing circuit used therewith is provided with distinct time constants. It may be appreciated that, if desired, a third time constant may be provided, this third time constant being introduced when the voltage across the condenser reaches another predetermined level. Also, although a single condenser is shown, it should be appreciated that the equivalent of a single condenser may be used, such as a plurality of condensers connected in parallel so as to increase the overall capacitance thereof or, alternatively, a plurality of condensers connected in series so as to reduce the overall capacitance thereof. It is intended that the appended claims be interpreted as including the foregoing as well as other such changes and modifications.

What is claimed is:

1. For use in a switching type regulator which includes a source of unregulated DC voltage, a switching circuit for interrupting said unregulated DC voltage to produce an AC voltage having a duty cycle which is a function of the operation of said switching circuit, a converter for converting said AC voltage to a regulated DC voltage, a controllable pulse generator for supplying pulses of controllable duration to said switching circuit thereby determining the duty cycle of said AC voltage, feedback means responsive to variations in said regulated DC voltage for controlling the duration of said generated pulses to maintain said regulated DC voltage at a desired level, and means for selectively limiting the operation of said pulse generator, a control circuit for resetting said last-mentioned means to an initial state and for gradually changing the duration of said pulses generated by said pulse generator in response to a predetermined condition, said control circuit comprising voltage generating means for generating a control voltage having a first rate of change with respect to time; reset means for resetting said means for selectively limiting the operation of said pulse generator when said control voltage attains a first level; means for changing the rate at which said control voltage changes once said means for selectively limiting the operation of said pulse generator is reset such that said control voltage then changes at a second rate of change with respect to time, said second rate of change being slower than said first rate of change; and means for using said control voltage at said second rate of change to correspondingly change the duration of said pulses generated by said pulse generator, whereby the level of said regulated DC voltage gradually changes.

2. The control circuit of claim 1 wherein said voltage generating means comprises a condensor; a charging circuit coupled to said condensor for charging said condensor at said first rate to produce said control voltage across said condensor; and means for changing the time constant of said charging circuit so as to charge said condensor at said second rate when said control voltage attains said first level.

3. The control circuit of claim 2 wherein the change in said control voltage across said condensor is an increase in voltage with respect to time; and wherein the voltage across said condensor first is caused to increase when said switching type regulator is turned ON.

4. The control circuit of claim 3 wherein said pulse generator comprises a multivibrator having a capacitor coupled thereto, the duration of the pulses generated by said multivibrator being determined by the voltage across said capacitor, and wherein a charging current is caused to flow to said capacitor as a function of said control voltage thereby to determine the voltage across said capacitor.

5. The control circuit of claim 4 wherein said charging circuit comprises a voltage source for providing a voltage when said regulator is turned ON; a current mirror circuit coupled to said voltage source and having plural current conducting channels therethrough, one of said channels being coupled to said condensor for supplying a charging current thereto so as to increase the voltage across said condensor and another of said channels being coupled to variable impedance means; and transistor means coupled to said condensor to receive the voltage thereacross and to have the conductivity thereof determined by said received voltage, said transistor means changing the impedance of said variable impedance means when said voltage across said condensor attains said first level so as to reduce the charging current supplied to said condensors, the conductivity of said transistor means controlling the magnitude of the charging current flowing to the capacitor coupled to said multivibrator.

6. The control circuit of claim 5 further comprising a second current circuit for supplying said charging current to said capacitor, said second current mirror circuit having one conducting channel connected to said transistor means so that the magnitude of the current therethrough is controlled by the conductivity of said transistor means, and said second current mirror circuit having a second conducting channel connected to said capacitor.

7. For use in a switching type regulator which includes a source of unregulated DC voltage, a switching circuit for interrupting said unregulated DC voltage to produce an AC voltage having a duty cycle which is a function of the operation of said switching circuit, a convertor for converting said AC voltage to a regulated voltage, a controllable multivibrator for supplying pulses of controllable duration to said switching circuit thereby determining the duty cycle of said AC voltage, feedback means responsive to variations in said regulated DC voltage for controlling the duration of said generated pulses to maintain said regulated DC voltage at a desired level, and means for selectively limiting the operation of said multivibrator, a control circuit for resetting said last-mentioned means and for gradually changing the duration of the pulses generated by said multivibrator when said regulator is turned ON, said control circuit comprising a condensor; a first current mirror circuit having one current conducting channel connected in common to said condensor for supplying a charging current thereto and to one current conducting channel included in a second current mirror circuit, said first current mirror circuit having a second current conducting channel connected to a second current conducting channel included in said second current mirror circuit; a switching transistor connected to said second current conducting channel included in said first current mirror circuit and being conductive when said regulator is turned ON so that substantially all of the current in said second current conducting channel of said first current mirror circuit flows therethrough and substantially all of the current in said first current conducting channel of said first current mirror circuit flows as a charging current to said condensor to rapidly increase the voltage thereacross; transistor means coupled to said condensor and having the conductivity thereof controlled by said voltage across said condensor, said transistor means causing said switching transistor to be non-conductive when said voltage across said condensor increases to a first level, whereby said second current mirror circuit becomes conductive to reduce the charging current flowing to said condensor, and said transistor means additionally causing said means for selectively limiting the operation of said multivibrator to be reset; and a third current mirror circuit having one current conducting channel thereof connected in series with said transistor means to have the current flowing therethrough determined by the conductivity of said transistor means, said third current mirror circuit having a second current conducting channel connected to said multivibrator to control the duration of the pulses generated by said multivibrator as a function of the current flowing therethrough.

8. The control circuit of claim 7 wherein the current conducting channels of said second current mirror circuit include different impedances so that the currents flowing therethrough differ from each other.

9. For use in a switching type regulator which includes a source of unregulated DC voltage, a switching circuit for interrupting said unregulated DC voltage to produce an AC voltage having a duty cycle which is a function of the operation of said switching circuit, a convertor for converting said AC voltage to a regulated DC voltage, a controllable multivibrator for supplying pulses of controllable duration to said switching circuit thereby determining the duty cycle of said AC voltage, feedback means responsive to variations in said regulated DC voltage for controlling the duration of said generated pulses to maintain said regulated DC voltage at a desired level, and means for selectively limiting the operation of said multivibrator; a control circuit for resetting said last-mentioned means and for gradually changing the duration of the pulses generated by said multivibrator when said regulator is turned ON, said control circuit comprising a condensor; a first current mirror circuit having one current conducting channel connected to said condensor for supplying a charging current thereto, a second current conducting channel connected to a constant impedance and a third current conducting channel, the magnitude of said charging current being determined by the sum of the currents flowing through said second and third current conducting channels, a switching transistor connected to said third current conducting channel included in said first current mirror circuit and being conductive when said regulator is turned ON so that current flows in said third current conducting channel; transistor means coupled to said condensor and having the conductivity thereof controlled by the voltage across said condensor, said transistor means causing said switching transistor to be non-conductive when said voltage across said condensor increases to a first level, whereby current substantially ceases to flow in said third current conducting channel, thereby reducing the magnitude of said charging current, and said transistor means additionally causing said means for selectively limiting the operation of said multivibrator to be reset; and a second current mirror circuit having one current conducting channel thereof connected in series with said transistor means to have the current flowing therethrough determined by the conductivity of said transistor means, said second current mirror circuit having a second current conducting channel connected to said multivibrator to control the duration of the pulses generated by said multivibrator as a function of the current flowing therethrough.

10. The control circuit of claim 7, 8 or 9 wherein the current mirror circuit having the second current conducting channel thereof connected to said multivibrator has the one current conducting channel thereof included in said feedback means such that the current therethrough changes as a function of said variations in said regulated DC voltage, whereby said duration of said pulses generated by said multivibrator is controlled to correct for said regulated DC voltage variations.